United States Patent [19]

Heynderickx et al.

[11] Patent Number: 5,221,978
[45] Date of Patent: Jun. 22, 1993

[54] LIQUID-CRYSTAL DISPLAY DEVICE HAVING ROTATIONALLY SYMMETRICAL ISO-CONTRAST CURVES

[75] Inventors: Ingrid E. J. R. Heynderickx, Eindhoven, Netherlands; Dirk J. Broer, Wilmington, Del.; Johannes C. H. Mulkens, Eindhoven, Netherlands

[73] Assignee: U.S. Philips Corporation, New York, N.Y.

[21] Appl. No.: 703,540

[22] Filed: May 21, 1991

[30] Foreign Application Priority Data

Jun. 25, 1990 [NL] Netherlands ............... 9001444

[51] Int. Cl.[5] ............... G02F 1/133; G02F 1/1335
[52] U.S. Cl. ............... 359/53; 359/63
[58] Field of Search ............... 359/53, 63

[56] References Cited

U.S. PATENT DOCUMENTS

| | | | |
|---|---|---|---|
| 4,039,254 | 8/1977 | Harsch | 359/53 |
| 4,099,855 | 6/1978 | Wisbey et al. | 359/53 |
| 4,231,639 | 11/1980 | Banda | 359/53 |
| 4,376,567 | 3/1983 | Banda | 359/53 |
| 4,443,065 | 4/1984 | Funada et al. | 359/53 |
| 4,610,507 | 9/1986 | Kamamori et al. | 359/53 |
| 4,927,240 | 5/1990 | Stolov et al. | 359/53 |
| 5,024,850 | 6/1991 | Broer et al. | 427/47 |

Primary Examiner—William L. Sikes
Assistant Examiner—Anita Pellman Gross
Attorney, Agent, or Firm—Norman N. Spain

[57] ABSTRACT

A liquid-crystal display device having an improved picture quality is obtained by rendering the iso-contrast curves rotationally symmetrical. This is obtained by means of a double cell construction, in which two identical TN-cells are present between two parallel polarizers, which TN cells are arranged relative to each other in such a manner that the director at the front face of the second cell encloses an angle of 180° with the director at the front face of the first cell. A polarizer is provided between both cells, the direction of polarization of said polarizer extending perpendicularly to the direction of polarization of the two other polarizers.

12 Claims, 1 Drawing Sheet

LIQUID-CRYSTAL DISPLAY DEVICE HAVING ROTATIONALLY SYMMETRICAL ISO-CONTRAST CURVES

BACKGROUND OF THE INVENTION

The invention relates to a liquid-crystal display device comprising two supporting plates having drive electrodes for applying a voltage across a layer of liquid-crystal material which is disposed between said supporting plates and which has a positive dielectric anisotropy and a wall orientation and twist angle of the liquid-crystal molecules, a birefringent effect at the lowest possible operating voltage being obtained by using said display device.

It is commonly known that in the case of perpendicularly incident light, a liquid-crystal display device, popularly termed TN-cell (Twisted Nematic), between crossed polarizers is not transparent to light when a sufficiently high voltage is applied across the cell. In this situation, the liquid-crystal molecules extend predominantly perpendicularly to the supporting plates, as a result of which the birefringent effect disappears almost completely and, hence, the crossed polarizers are not transparent to light. In practice, however, it has been found that in said situation such a cell always transmits some light, i.e. predominantly in the viewing directions the projection of which is located in the quadrant which is diagonally situated relative to the quadrant comprising the projection of the director in the centre of the cell on the front face, the axes of the quadrants being determined by the directors at the front and rear faces. The dark or non-transmissive state of the display device is poorly defined in said viewing directions, as a result of which they exhibit a much lower contrast than in the other viewing directions. When iso-contrast curves are polarly laid out as a function of the viewing angle (the angle with the normal) and as a function of the azimuth angle, it is found that said curves are not rotationally symmetrical about the normal. This phenomenon does not occur when the polarizers with their directions of polarization are arranged parallel to each other. Crossed polarizers are, nevertheless, preferred for most applications because they enable high contrasts to be obtained more readily than with parallel polarizers and because the dark state is colourless. The fact is, that when the polarizers are arranged in parallel, the transmission for the dark state of the display device is a function of the wavelength-dependent birefringence.

The picture quality of a display device of the TN-type could be considerably improved when the iso-contrast curves could be made rotationally symmetrical or, in other words, when the residual transmission in the non-transmissive state of the TN-display device could be equally reduced for all viewing angles.

This problem could be solved by means of a double cell construction, in which two identical TN cells are present between two parallel polarizers, which cells are arranged relative to each other in such a manner that the director at the front face of the second cell forms an angle of 180° with the director at the front face of the first cell. A polarizer has to be provided between both cells, the direction of polarization of which extends perpendicularly to the direction of polarization of both other polarizers. When both cells are not driven, the combination is transmissive, the overall transmission being approximately 10% less than that of a single TN cell because the presence of a third polarizer introduces an additional light absorption. When both cells are driven simultaneously, the combination is, at all angles, not transmissive because the light which in this state leaks through one cell into the other is blocked. Such a construction is known from, for example, the Abstract of the published Japanese Patent Application 61-46930 (Patent Abstracts of Japan, Vol. 10, No. 206, p. 76, P478, Jul. 18, 1986). According to said Abstract, this construction leads to an improvement of a visibility characteristic which is not further defined in the Abstract.

However, the above-described and other display devices based on a double cell construction which are known from the literature generally have the disadvantage that the picture elements have to be individually defined and driven for each separate cell. A further important disadvantage is that the intermediate layer—in the known construction: two glass plates and a polarizer—is comparatively thick relative to the dimensions of the picture elements, so that the image on the display device has less sharp contours owing to parallax effects.

SUMMARY OF THE INVENTION

It is an object of the invention to provide a solution to the above problems and, more particularly, to maximally suppress parallax during the formation of the image by using a display device which is constructed such that the iso-contrast curves are rotationally symmetrical to the maximum extent possible.

According to the invention, this object is achieved by a construction a first version of which is characterised in that a) a third supporting plate is arranged between both supporting plates, which plate is provided with a polymer layer (layer P) on one side, which polymer layer polarizes the passing light in one direction and orients liquid-crystal molecules in a direction perpendicular to said direction of polarization, and which plate is provided on the other side with a layer (layer O) which orients liquid-crystal molecules, b) the facing sides of both supporting plates are provided with layers which orient liquid-crystal molecules, the directions of orientation enclosing an angle of 90° with each other, and the layer on the side of the third supporting plate facing the side where the light is incident having a direction of orientation which encloses an angle of 180° with the direction of orientation of the orientation layer on the supporting plate facing away from the side where the light is incident, and the layer on the other side having a direction of orientation which encloses an angle of 180° with the direction of orientation of the orientation layer which is present on the supporting plate which is located on the side of the device where the light is incident, c) the display device also comprises two polarizers between which the layer of liquid-crystal material is arranged and whose directions of polarization extend parallel to each other and perpendicularly to the direction of polarization of layer P (version 1).

In this version, the directions of orientation of layer O and layer P extend perpendicularly to each other.

In a second version, the construction according to the invention is characterised in that a) a third supporting plate is arranged between the two supporting plates, said plate being provided with a polymer layer (layer P) on the side where the light is incident, which layer polarizes the passing light in one direction and orients liquid-crystal molecules in a direction perpendicular to said direction of polarization, and said plate being provided on the other side with a layer (layer O) which orients liquid-crystal molecules, b) the facing sides of the two supporting plates are provided with layers which orient liquid-crystal molecules, the directions of orientation enclosing an angle of 0° with each other, and layer P on the side of the third supporting plate facing the side where the light is incident having a direction of orientation which encloses an angle of 90° with the direction of orientation of the orientation layer on the supporting plate facing away from the side where the light is incident, and layer O having a direction of orientation which encloses an angle of 90° with the direction of orientation of the orientation layer situated on the supporting plate which is located on the side where the light is incident, c) the display device also comprises two polarizers between which the layer of liquid-crystal material is disposed and whose directions of polarization extend parallel to each other and perpendicularly to the direction of polarization of layer P (version 2).

In this version, the directions of orientation of layer O and layer P extend parallel to each other.

DETAILED DESCRIPTION OF THE DRAWING

Figure 1:
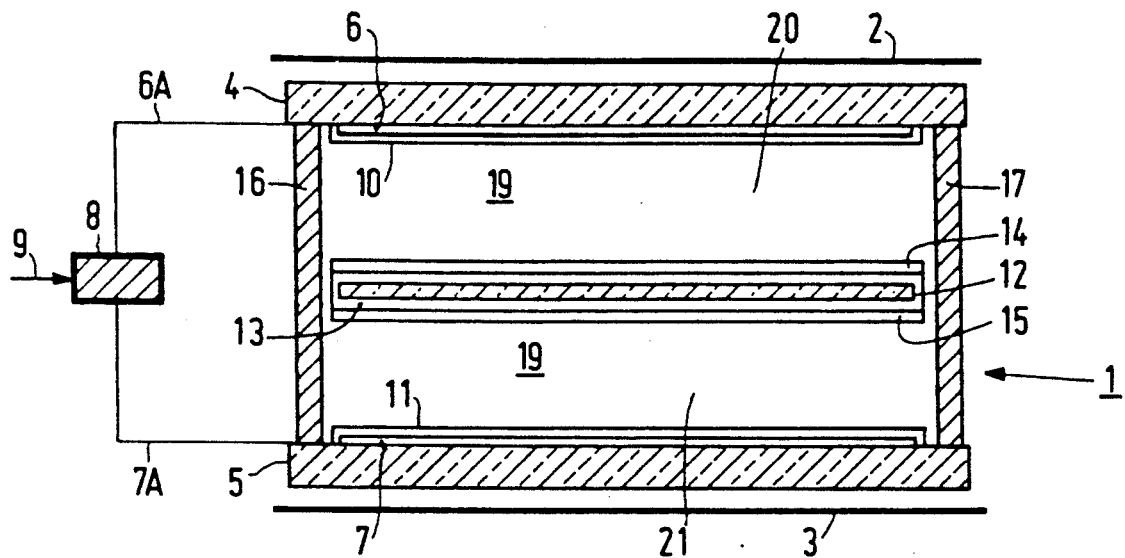

FIG. 1 (not to scale) is a diagrammatic sectional view of a display device according to the invention.

Figures 2, 3:
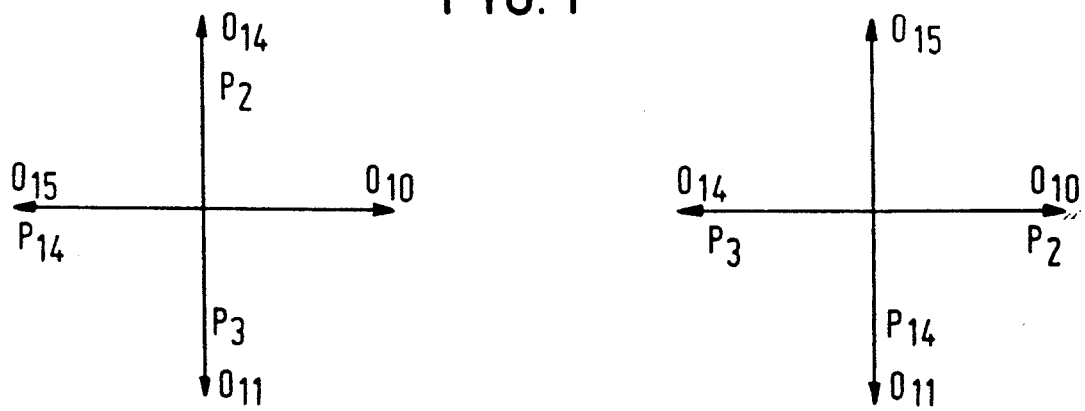

FIGS. 2 and 3 diagrammatically show the directions of polarization of the various polarizers present in the display device and the direction of the directors at the surface of both outer supporting plates, which surface faces the interior of the cell, and at both surfaces of the interposed third supporting plate in accordance with version 1.

Figures 4, 5:
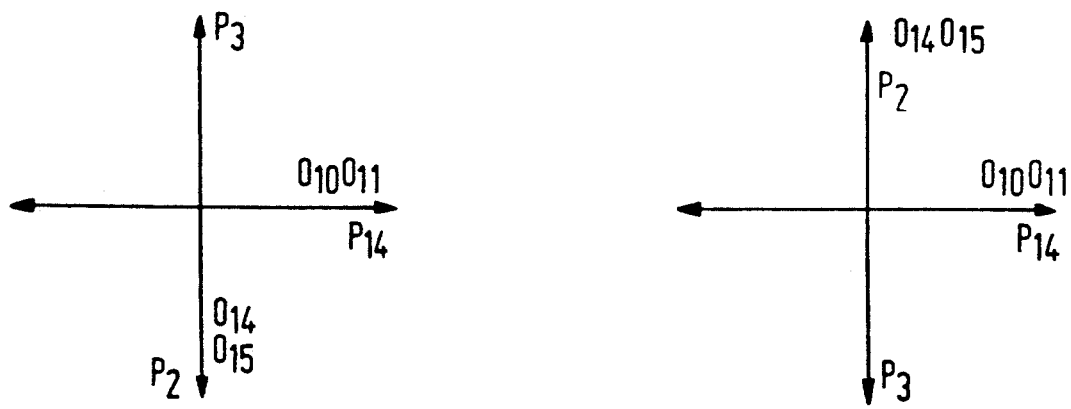

FIGS. 4 and 5 diagrammatically show directions of polarization and orientation in accordance with version 2.

DETAILED DESCRIPTION OF THE INVENTION

The thickness of the third supporting plate can be very small and need not exceed the minimum thickness dictated by the dimensional stability and handleability during the provision of the layers in the cell. In practice it was found that in general glass plates having a thickness of 20 to 100 μm can be used. When supporting plates of a thickness larger than 100 μm are used, an increase of parallax takes place at a certain pixel size, which effect can be noticed sooner according as the pixels are smaller. Until now, the best results were obtained with dimensions between 30 and 70 μm, in practice a suitable thickness being approximately 50 μm. In a suitable embodiment of the third supporting plate, said plate is provided with a polyimide layer on one side, which layer is used as an orientation layer and which is rubbed in one direction (layer O).

The other layer (layer P) can be obtained, for example, by providing the surface of the glass plate with a layer of a polymerizable liquid-crystal monomer compound which also contains a dichroic dye and an initiator, after which the liquid-crystal monomer compound is oriented by means of an external force and then polymerized by exposing it to radiation. The desired orientation can be obtained by means of, for example, a field of force, the field direction of which can be adjusted in a simple manner, such as an electric or magnetic field. However, it is alternatively possible to obtain said orientation by means of, for example, rubbed polymer layers which contact the liquid-crystal monomer compound during its polymerization.

For the manufacture of layer P, suitable monomers can be used which are defined by the general formula PBNQ 

where P is a polymerizable group,

B is a bridging group,

N is a (mesogenic) nematic or smectic liquid-crystalline group containing at least a p-phenyl group and/or a cyclohexyl group, and Q is a substituent of the group N or the group BP, where B and P have the above-mentioned meaning.

Examples of suitable polymerizable groups are an acrylate or methacrylate group, i.e. a group having the formula:

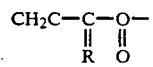

where
R=H or $CH_3$, an epoxy group which corresponds to the formula:

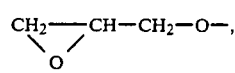

a vinyl ether group which corresponds to the formula:

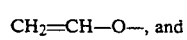

a thiol group —SH, in combination with an ethylene group $CH_2=CH—$, which combination is referred to as thiolene system.

Examples of mesogenic groups are given by the following formulae:

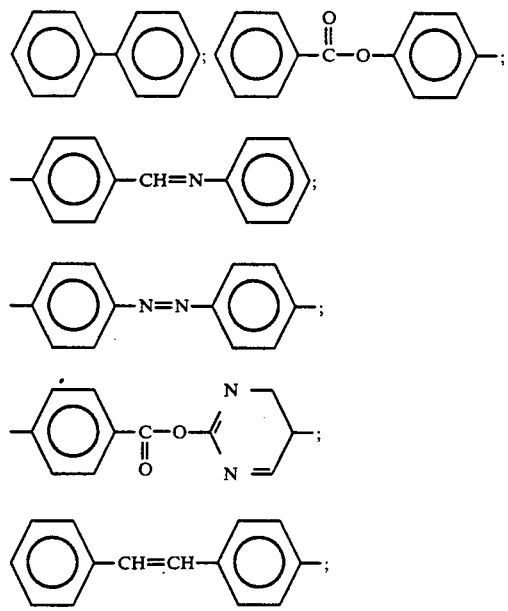

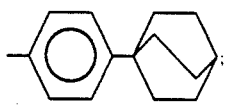

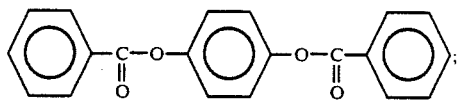

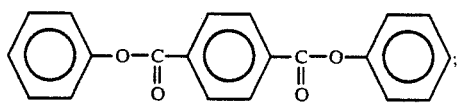

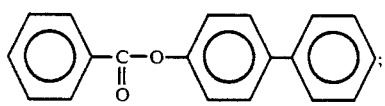

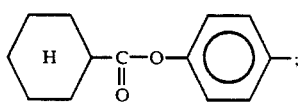

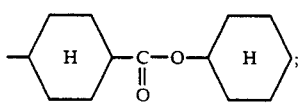

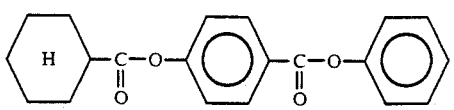

Examples of bridging groups are given by the formulae:

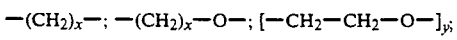

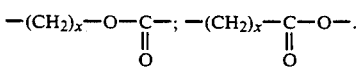

Examples of substituents of the mesogenic group are cyano, halogen, hydrogen, alkyl group having 1-8 carbon atoms, alkoxy group having 1-8 carbon atoms, nitro, amino group or an alkyl-substituted amino, the alkyl being of 1-4 carbon atoms.

Suitable monomers are, in particular, liquid-crystalline (mesogenic) diacrylates which are given by the formula:

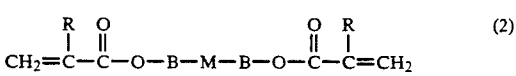

where
R, B and M have the above meaning.

Examples of effective diacrylates are given by the following formulae:

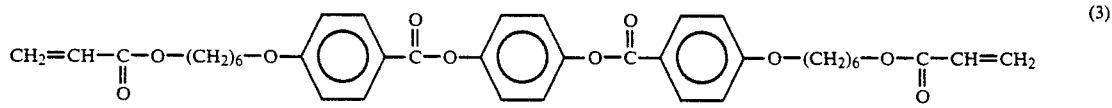

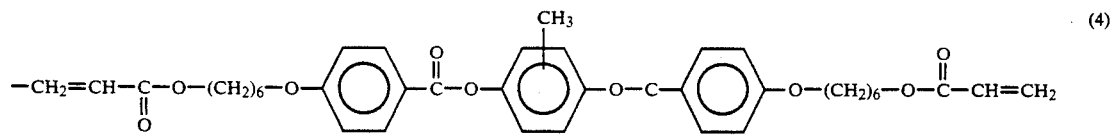

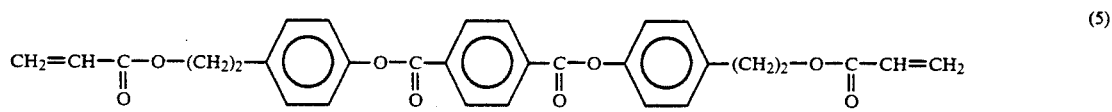

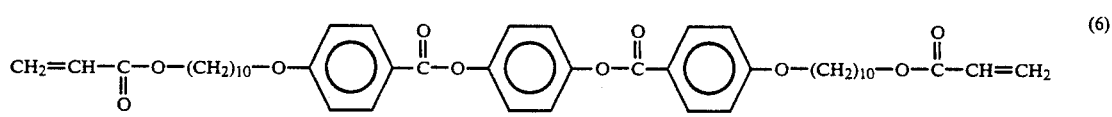

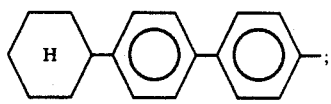

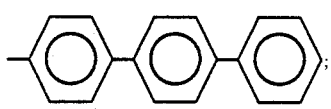

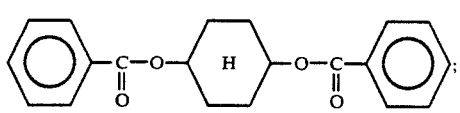

Examples of suitable initiators for the radical polymerization of (meth)acrylates and the thiolenes under the influence of UV light are aromatic carbonyl compounds or a ketal such as benzil dimethyl ketal:

Examples of photoinitiators for the cationic photopolymerization of epoxy and vinylether compounds are diaryliodonium compounds such as diphenyliodonium hexafluoro arsenide:

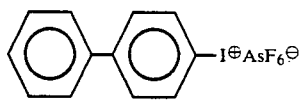
(8)

If desired, compound (7) can be added thereto as a sensitizer. For example, a mixture of the following dyes can be used as the dichroic black dye:

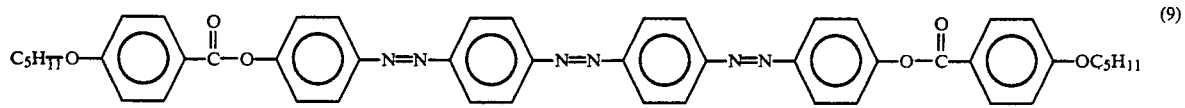
(9)
λ max = 410 nm

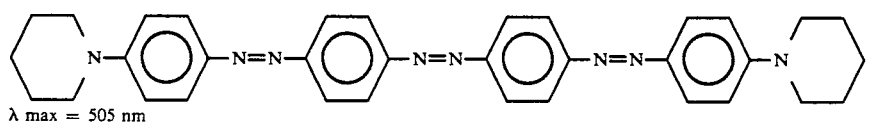
(10)
λ max = 505 nm

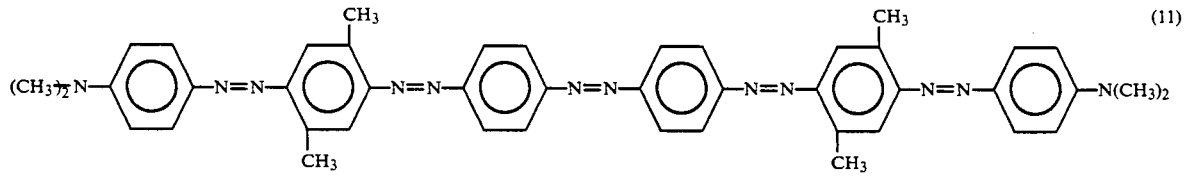
(11)
λ max = 595 nm

For further particularities with respect to the manufacture of layer P, reference is made to the published European Patent Application EP-A-331233 the contents of which are hereby incorporated by reference.

In a preferred embodiment of the display device according to the invention, the third supporting plate is provided with a layer of semiconducting indium tin oxide (ITO-layer) on both sides before the layers O and P are successively provided, both layers being electrically interconnected. By this measure, too large a voltage drop across the third supporting plate, which might adversely affect the picture quality of the display device, is prevented.

An embodiment of a display device according to the invention will be described in greater detail with reference to the accompanying drawing, in which FIG. 1 (not to scale) is a diagrammatic sectional view of a display device according to version 7 of the invention, FIGS. 2 and 3 diagrammatically show the directions of polarization of the various polarizers present in the display device and the direction of the directors at the surface of both outer supporting plates, which surface faces the interior of the cell, and at both surfaces of the interposed third supporting plate in accordance with version 1, FIGS. 4 and 5 diagrammatically show directions of polarization and orientation in accordance with version 2.

Display device 1, as diagrammatically shown in section in FIG. 1, comprises two supporting plates 4 and 5 of glass having a thickness of approximately 1 mm which are arranged between two polarizers 2 and 3 having parallel directions of polarization. The surface of the supporting plates 4 and 5 facing the interior of the cell is provided with electrodes 6 and 7, respectively, which define, for example, a matrix of picture elements. If desired, said picture elements can be driven through switching elements and drive electrodes (active drive); the picture elements can alternatively be defined by overlapping portions of strip-shaped electrodes and then be provided immediately with selection signals and data signals (passive drive). The drive voltages are obtained by means of, for example, a drive circuit 8 which converts the incoming information 9 (TV-signals, information about datagraphic symbols etc.) into drive voltages which are applied to the electrodes 6 and 7 through conductors 6A and 7A. Layers 10 and 11 of electrically insulating material, for example polyimide, are present on the electrodes 6 and 7, said layers also serving as orientation layers.

Display device 1 further comprises a third supporting plate which is composed of a thin glass plate 12 (thickness 50 μm) which, in the present embodiment, is covered with an electrically conducting ITO-layer 13 on all sides. An orientation layer 15 of rubbed polyimide (layer O) is provided on the ITO-layer 13 on the side facing the supporting plate 5. On the other side (the side where the light is inside the third supporting plate is provided with a layer 14 (layer P) having the properties that it passes the light only in a direction of polarization, while simultaneously orienting the molecules of the liquid-crystal material 19. A layer 14 formed of a mixture containing 96 wt.% of a liquid-crystalline monomer compound of formula 3, 2.5 wt.% of a dichroic azo-dye mixture of formulae 9-11 and 1.5 wt.% of an initiator shown in formula 7, is provided on the glass substrate 12 having a thickness of 50 μm by means of a spin-coating process. Layer 14 has a thickness of approximately 5 μm. Layer 14 is heated to a temperature above the transition temperature (108° C.), from the crystalline phase to the nematic phase; a suitable temperature is 120° C. Under the influence of a magnetic field of 10 kGauss having a field direction parallel to the surface of substrate 12, the molecules of the liquid-crystalline monomer compound are oriented in a direction parallel to the magnetic field direction. In this process, the dichroic dye molecules are oriented also. The layer is exposed to UV light having a wavelength of 360 nm for several minutes, while maintaining the temperature and the magnetic field. The power of the low-pressure mercury lamp used was 5 mW/cm². As a result of said exposure, the monomer molecules of layer 14 are polymerized and their orientation fixed. With respect to light incident on said layer 14, the polarization component parallel to the direction of orientation is absorbed by the dye molecules which are also oriented, and light which is polarized perpendicularly to the direction of orientation is passed and reaches cell compartment 21.

Display device 1 can be constructed, for example, as follows. Glass fibres having a diameter of, for example, 4 μm (may also be, for example, 10 μm) are provided on both supporting plates 4 and 5, as a result of which the thickness of the cell compartments 20 and 21 is 4 μm. Subsequently, the two supporting plates 4 and 5, carrying the layers 6, 10 and 7, 11, respectively, are combined with the third supporting plate, carrying layers 13, 14 and 15, to form one cell. Said cell is subsequently sealed with a glued seam 16 and 17, for example, of epoxy resin. A filling hole (not shown in the Figure) is formed in the glued seam, through which hole both cell compartments 20 and 21 can be simultaneously filled with liquid-crystal material. For this reason, the surface of the third supporting plate is somewhat smaller than the inner section of the cell.

In the above-described embodiment, the orientation of layer P is obtained by a magnetic field. Orientation can alternatively be obtained by rubbing the surface of the substrate in one direction.

In FIGS. 2 and 3, the arrows indicate the respective directions of polarization and orientation of the various polarizers and orientation layers according to version 1. The horizontal arrows indicate the direction of polarization of layer 14 and the directions of orientation imposed on the liquid-crystal material 19 at the surfaces of the layers 10 and 15 (mutual angle of 180°), respectively. The vertical arrows indicate the direction of polarization of polarizers 2 and 3 (mutually parallel and perpendicular to the direction of polarization of layer 14) and the directions of orientation at the surfaces of the layers 11 and 14 imposed on the liquid-crystal material 19 (mutual angle of 180°), respectively.

A display device in accordance with FIG. 1, having directions of polarization of the polarizers and directions of orientation of the orientation layers, as shown in FIG. 2, operates as follows: when no voltage is applied across the cell, the assembly is transparent to light; when a sufficiently high voltage is applied, the assembly is dark: any light leaking through the first compartment is absorbed in the second compartment. Consequently, the iso-contrast curves measured on such a cell are substantially rotationally symmetrical relative to the normal.

FIG. 3 shows the directions of polarization of the polarizers and directions of orientation of the orientation layers in which, in the display device of FIG. 1, polarizer 2 is arranged parallel to the director at the front face (layer 10). This requires the layers 14 and 15 of FIG. 1 to be interchanged on the third supporting plate (12, 13, 14, 15). The orientation layer 15 is then situated on the side where the light is incident and the orientation and polarization layer 14 is located on the side facing away from the side where the light is incident.

In version 2, there are various possibilities for the direction of the orientation layers relative to each other; FIGS. 4 and 5 show the directions of polarization of the polarizers and directions of orientation of orientation layers according to these possibilities.

The reference numerals in FIGS. 3, 4 and 5 have the same meaning as in FIG. 2. The use of cells which are constructed in accordance with said diagrams also enables substantially symmetrical iso-contrast curves to be obtained.

We claim:

1. A liquid-crystal display device comprising first and second supporting plates having drive electrodes for applying a voltage across a layer of liquid-crystal material which is disposed between said first and second supporting plates and which has a positive dielectric anisotropy a wall orientation and twist angle of the molecules of said liquid-crystal material, a birefringent effect at the lowest possible operating voltage being obtained by using said display device, characterized in that a) immersed in said layer of liquid-crystal material a third supporting plate is arranged between said first and second supporting plates, which third plate is provided with a polymer layer (layer P) on one side, which polymer layer polarizes the passing light in one direction and orients liquid-crystal molecules in a direction perpendicular to said direction of polarization, and which third plate is provided on the other side with a layer (layer O) which orients liquid-crystal molecules, b) the facing sides of both first and second supporting plates are provided with layers which orient liquid crystal molecules, the directions of orientation enclosing an angle of 90° with each other, and the layer on the side of the third supporting plate facing the side of the device where the light is incident having a direction of orientation which encloses an angle of 180° with the direction of orientation of the orientation layer on the one of the first and second supporting plates facing away from the side of the device where the light is incident, and the other side of the third plate having a direction of orientation which encloses an angle of 180° with the direction of orientation of said orientation layer which is located on the side of the supporting plate of the device where the light is incident, c) the display device also comprises two polarizers between which the supporting plates are arranged and whose directions of polarization extend parallel to each other and perpendicularly to the direction of polarization of layer P.

2. A liquid-crystal display device comprising first and second supporting plates having drive electrodes for applying a voltage across a layer of liquid-crystal material which is disposed between said first and second supporting plates and which has a positive dielectric anisotropy wall orientation and twist angle of the molecules of said liquid-crystal, a birefringent effect at the lowest possible operating voltage being obtained by using said display device, characterized in that a) a third supporting plate is immersed in said layer of liquid-crystal material and arranged between said first and second supporting plates, which third plate is provided with a polymer layer (layer P) on the side where the light is incident, which layer polarizes the passing light in one direction and orients liquid-crystal molecules in a direction perpendicular to said direction of polarization, and said third plate being provided on the other side with a layer (layer O) which orients liquid-crystal molecules, b) the facing sides of the first and second supporting plates are provided with layers which orient liquid-crystal molecules, the directions of orientation enclosing an angle of 0° with each other, and layer P on the side of the third supporting plate facing the side of the device where the light is incident having a direction of orientation which encloses an angle of 90° with the direction of orientation of the orientation layer on the one of said first and second supporting plates which faces away from the side of the device where the light is incident, and layer O having a direction of orientation which encloses an angle of 90° with the direction of orientation of the orientation layer situated on the supporting plate of the first and second supporting plates which is located on the side of the device where the light is incident, c) the display device also comprises two polarizers between which the supporting plates are disposed and whose directions of polarization extend parallel to each other and perpendicularly to the direction of polarization of layer P.

3. A display device as claimed in claim 1 or 2, characterised in that the third supporting plate has a thickness of 20 to 100 μm.

4. A display device of claim 3 wherein the thickness of the third supporting plate is 30 to 70 um.

5. A display device as claimed in claim 1 or 2, characterized in that layer O consists of a layer of rubbed polyimide.

6. A display device as claimed in claim 1 or 2, characterized in that layer P consists of a layer of a liquid-crystal polymer containing a dichroic dye.

7. A display device as claimed in claim 6, characterised in that the dichroic dye is a black dichroic dye.

8. A display device of claim 6, characterized in that the layer P consists of a layer of a polymerized mixture of a liquid-crystalline monomer, a polymerization initiator and a dichroic dye.

9. A display device of claim 8 wherein the monomer is a diacrylate.

10. The display device of claim 9 wherein the dye is a dichroic azo-dye.

11. A display device as claimed in claim 1 or 2, characterized in that the third supporting plate floats between the other two supporting plates and the surface areas of the third plate are smaller than those of the other two supporting plates.

12. A display device as claimed in claim 1 or 2, characterized in that the third supporting plate consists of a glass plate, each side of which is provided with an ITO layer, said ITO layers being electrically interconnected and one of said ITO layers being provided with said layer O and the other of said ITO layers being provided with said layer P.

* * * * *